Aug. 18, 1970    R. C. GRANT ET AL    3,524,550

FILTER ASSEMBLY

Filed May 23, 1969

INVENTORS
ROBERT C. GRANT
WILLIS D. MILLER

BY

*Fryer, Tjensvold, Feix, Phillips & Lempio*
ATTORNEYS

United States Patent Office 3,524,550
Patented Aug. 18, 1970

1

3,524,550
FILTER ASSEMBLY
Robert C. Grant, Creve Coeur, and Willis D. Miller, Peoria Heights, Ill., assignors to Caterpillar Tractor Co., Peoria, Ill., a corporation of California
Filed May 23, 1969, Ser. No. 827,303
Int. Cl. B01d 27/08
U.S. Cl. 210—232                          2 Claims

ABSTRACT OF THE DISCLOSURE

A filter assembly for use in a housing having a removable cover wherein fluid to be filtered is circulated from the interior of the housing to a passage in the cover. The filter assembly includes a filter element and an axial rod which may be preassembled to the cover with spring means maintaining proper sealing about the filter element, the housing including means for compressing the spring in order to establish proper sealing forces on the element when the cover and filter assembly are installed to the housing.

---

Figure 1:
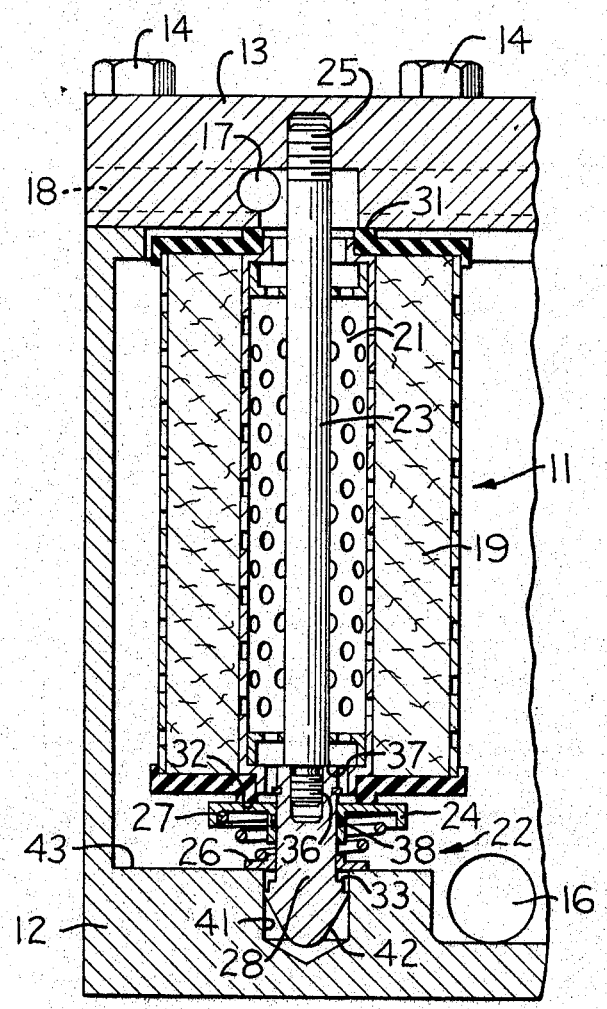

The present invention relates to filter assemblies which may be employed, for example, to filter fluids such as engine fuel. More particularly, the invention relates to a filter assembly adapted for use in a housing having a removable cover wherein fluid to be filtered is circulated from the housing interior to a passage in the cover. The present invention permits preassembly of the filter assembly to the cover in a generally sealed condition. The filter assembly may then properly be installed when the cover is secured to the housing. Means are provided to establish preselected sealing forces on a filter element in the assembly when the cover and filter assembly are mounted to the housing.

In filter assemblies of the type referred to above the normal procedure is to install a rod within the housing and then to install a filter element and other components such as springs upon the rod. The filter cover is then installed on the housing and serves as a guide for the opposite end of the rod. Installation of these prior art assemblies tends to be time consuming, particularly since the rod is usually not properly aligned for engagement with the cover. This problem tends to be further amplified in that two or more similar filter assemblies may be employed within a single housing, and it is necessary to align a rod for each filter assembly with the same cover.

Also, in servicing engines with which the filters may be associated, it is frequently necessary to disassemble the filter, for example, to replace the filter element. Often the housing may not be completely drained of unfiltered fluid so that during installation of the filter assembly, some of the unfiltered fluid may be trapped in a portion of the filter element which is intended to contain only filtered or clean fluid. This is a particular problem where the filter is being employed to filter engine fuel, for example, since very small amounts of foreign material may tend to interfere with proper operation of an engine.

Yet another problem arises in the establishing of proper sealing forces upon the filter element so that fluid to be filtered is circulated only through the filter material of the element. If excessive sealing pressures are applied, early failure of the element may result. On the other hand, if inadequate sealing pressures are applied, the filter element may be susceptible to leakage.

Accordingly, it is an object of the present invention to provide a filter assembly which overcomes one or more of the above problems.

In particular, it is an object of the present invention to provide a filter assembly which facilitates its installation within a filter housing.

2

Still another object of the present invention is to provide a filter assembly wherein proper sealing pressures are applied to its filter element upon installation of the filter assembly within the housing.

Still other objects and advantages of the present invention are believed to be apparent from the following description having reference to the accompanying drawing.

Figure 2:
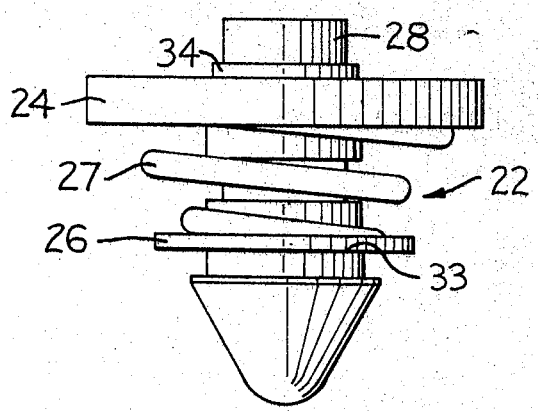

In the drawing:

FIG. 1 is a sectioned view of a filter assembly constructed according to the present invention and installed within a suitable housing; and FIG. 2 is an enlarged fragmentary view of a spring arrangement employed with the filter assembly of FIG. 1.

A filter assembly 11, constructed according to the present invention, is shown in FIG. 1 in an installed position within a filter housing 12 having a removable cover 13. The cover 13 may be secured to the housing, for example, by cap screws indicated at 14. Unfiltered fluid is normally introduced into the housing interior from an inlet port indicated at 16. The fluid is then circulated through the filter assembly 11 into an outlet port 17 and an outlet passage 18 formed within the cover 13.

The filter assembly 11 includes a filter element 19 which must be properly sealed within the filter housing so that unfiltered fluid is circulated through the filter element into an axial passage 21 which is in communication with the outlet port 17.

The present invention is particularly concerned with adapting the filter assembly 11 so that it may be preassembled upon the cover 13 for proper positioning within the housing 12 when the cover 13 is secured in place. A sealing arrangement indicated at 22 (also see FIG. 2) is included to apply proper sealing forces upon the element 19 when the cover 13 and filter assembly 11 are installed upon the housing.

The spring assembly 22 is supported by a rod 23 which axially penetrates the filter element 19 and may be secured to the housing as indicated at 25. The spring assembly 22 includes an annular ring 24 and an adapter ring 26 with a spring 27 being arranged for interaction between the two rings. As shown in FIG. 1, the rings 24, 26 are slidably mounted upon a nut 28 which forms an extension of the rod 23. The filter element 19 includes annular sealing surfaces 31 and 32 at its respective ends to properly seal the element 19 when it is installed between the cover 13 and the annular ring 24.

As contemplated by the present invention, the entire filter assembly is secured in place upon the cover 13 before the cover is secured to the housing 12. To install the filter assembly upon the cover, the rod 23 is first threaded into the cover 13 at 25. The filter element 19 is then positioned about the rod 23 and adjacent the cover 13 as shown in FIG. 1.

The spring assembly 22 is then installed as a preassembled unit upon the nut 28. The preassembled spring arrangement is more clearly shown in FIG. 2. The annular ring 24, adapter ring 26 and spring 27 are slidably mounted on the nut 28. The adapter ring 26 is positioned against a shoulder 33 formed generally at the base of the nut 28. The annular ring 24 is secured by a lock ring 34 generally toward the upper end of the nut 28 with the spring 27 being partially compressed between the two rings.

Together with the preassembled spring arrangement 22, the nut 28 is then threaded onto the rod 23 as is generally indicated at 36. When the nut 28 is engaged with a shoulder 37 on the rod, the annular ring 24 is shifted downwardly from the locking ring 34 to cause additional compression of the spring 27.

With the filter assembly 11 secured to the cover 13, the compressed spring 27 places a compressive load on the filter element 19 and provides for proper engagement of its sealing surfaces 31, 32 with the cover 13 and annular ring 24 respectively. Thus, the present filter assembly prevents unfiltered fluid from entering the axial passage 21 while the assembly is being installed within the housing. An additional seal ring 38 is also arranged between the annular ring 24 and the nut 28 to further insure complete sealing of the axial passage 21 from the housing interior except through filter material of the element 19.

With the filter assembly mounted on the cover 13, the cover is then secured to the housing 12 in the position shown by FIG. 1. During installation of the cover and filter assembly, the nut 28 is received by a bore 41 formed in the base of the housing 12. The end of the nut 28 is tapered as indicated at 42 to assist in piloting of the nut into the bore 41. As the cover and filter assembly are secured in place and the nut 28 enters the bore 41, the adapter ring 26 engages a surface 43 of the housing adajcent the bore 41 with the adapter ring being shifted upwardly to further compress the spring 27. Spacing between the surface 43 of the housing and the cover 13 is selected to properly compress the spring 27 and apply desired forces on the surfaces 31 and 32 of the filter element 19. Thus, the amount of compressive force employed to seal the filter element 19 may be preselected in order to protect the filter element 19 from damage and to insure its sealed condition within the housing 12.

What is claimed is:

1. A filter assembly for use in a hollow filter housing having a cover with fluid to be circulated through the filter assembly between the housing interior and a passage in the cover, comprising
   a cylindrical filter element suitable for circulation of fluid to be filtered between the outer periphery of the element and an axial passage therein,
   a rod disposed in the axial passage of the element and means for securing one end of the rod to the housing cover with the axial passage of the element in communication with the passage in the cover,
   an annular member slidably arranged on the rod at the opposite end of the filter element from the cover,
   an adapter member slidably arranged on the rod,
   a spring arranged for interaction between the annular member and adapter,
   shoulder means removably arranged on the rod end opposite the cover to support said adapter member and preload the spring so that the ends of the axial passage in the filter element are in sealing relation with the housing cover and annular member respectively when the element, rod, annular member, adapter and spring are assembled to the cover,
   support means in the housing opposite the cover for receiving the rod and for urging the adapter away from the shoulder means when the cover is secured to the housing, the support means being formed by a bore in the housing for receiving the rod and a surface of the housing element adjacent the bore for receiving the adapter, the surafce being suitably spaced apart from the cover to increase compression of the spring and apply desired sealing forces at the ends of the filter element, and
   a nut threaded to an end of the rod, the nut having a tapered end for piloted reception by the bore.

2. The invention of claim 1 wherein the shoulder means are formed on the nut, the annular member and the adapter member being slidably mounted on the nut and further comprising a snap ring on the nut for securing the ring, adapter member and spring in preassembled relation thereon.

References Cited
FOREIGN PATENTS 771,267  3/1957  Great Britain.
1,152,267  2/1958  France.

SAMIH N. ZAHARNA, Primary Examiner

T. A. GRANGER, Assistant Examiner

U.S. Cl. X.R.

210—453